Figure 1:
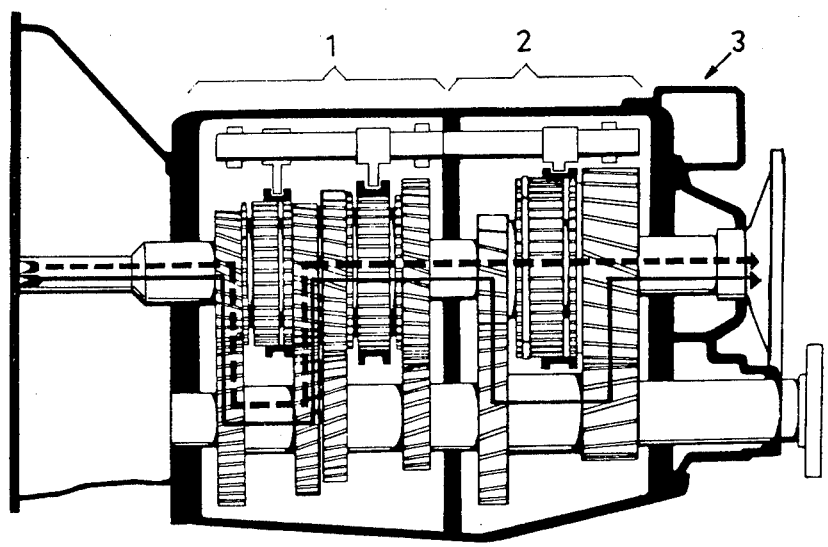

United States Patent [19]
Fredell et al.

[11] 4,269,079
[45] May 26, 1981

[54] ARRANGEMENT FOR PREVENTING INCORRECT SHIFTING IN A VEHICLE GEARBOX

[75] Inventors: Sören Fredell, Göthenborg; Stig Jarl, Mölnlycke, both of Sweden

[73] Assignee: AB Volvo, Göthenborg, Sweden

[21] Appl. No.: 27,092

[22] Filed: Apr. 4, 1979

[30] Foreign Application Priority Data

Apr. 24, 1978 [SE] Sweden .................. 7804650

[51] Int. Cl.³ .................. F16H 3/08; B60K 41/06
[52] U.S. Cl. ........................ 74/365; 74/850; 74/878
[58] Field of Search .................. 74/365, 878, 850, 875

[56] References Cited

U.S. PATENT DOCUMENTS

| | | | |
|---|---|---|---|
| 1,974,096 | 9/1934 | Bartz | 74/878 |
| 2,557,896 | 6/1951 | Soule et al. | 74/365 X |
| 3,103,826 | 9/1963 | Jaeschke | 74/365 X |
| 3,335,830 | 8/1967 | De Costelet | 74/365 X |
| 3,521,612 | 7/1970 | Santi et al. | 74/850 X |
| 3,810,532 | 5/1974 | Schuppel | 74/878 X |
| 3,864,991 | 2/1975 | Nembach | 74/878 X |

FOREIGN PATENT DOCUMENTS

| | | |
|---|---|---|
| 328301 | 3/1976 | Austria . |
| 689143 | 6/1964 | Canada .................. 74/875 |
| 1426450 | 11/1968 | Fed. Rep. of Germany . |
| 1946496 | 3/1971 | Fed. Rep. of Germany . |
| 2344797 | 3/1974 | Fed. Rep. of Germany . |
| 1920577 | 4/1978 | Fed. Rep. of Germany . |
| 7214981 | 11/1974 | Sweden . |
| 1322934 | 7/1973 | United Kingdom . |

*Primary Examiner*—Leslie Braun
*Attorney, Agent, or Firm*—Young & Thompson

[57] ABSTRACT

Arrangement for preventing incorrect shifting in a gearbox having a base portion and a two-speed range portion has a gear selector mechanism coupled to a shift unit and comprising a first blocking system coordinated with the shift unit of the range portion and the gear selector mechanism of the base portion to block shifting in the base portion during shifting of the shift unit in the range portion, and a second blocking system coordinated with means for sensing the rotational speed of the output shaft and with the gear selector mechanism of the base portion to prevent shifting to certain gears in the base portion when the rotational speed of the output shaft exceeds certain values. First and second blocking systems have a common blocking device. The first system has apparatus sensing the shifting movement of the shift unit and disposed to activate the blocking device to block the gear selector of the base portion in the neutral position during shifting. The second system has apparatus for sensing the lateral position of the gear lever and disposed, depending on the rotational speed of the output shaft, in the lateral position of first and second gear to actuate the blocking device to block the gear selector of the base portion in the neutral position.

7 Claims, 2 Drawing Figures

ARRANGEMENT FOR PREVENTING INCORRECT SHIFTING IN A VEHICLE GEARBOX

The present invention relates to an arrangement for preventing incorrect shifting in a gear box preferably intended for heavier motor vehicles, said gearbox having a base portion with a number of gear ratios and a two-speed range portion, coupled to the output shaft of the base portion, and having such gear ratios that the total gear ratio of the gearbox when the higher gear ratio of the range portion is used together with the lowest gear ratio of the base portion is higher than that when the lower gear ratio of the range portion is used together with the highest gear ratio of the base portion, the range portion having a gear selector mechanism operated by a shift unit, said device comprising a first blocking system, which is coordinated with the shift unit of the range portion and the gear selector mechanism of the base portion to block shifting in the base portion during the shifting movement of the shift unit in the range portion, and a second blocking system which is coordinated with means for sensing the rotational speed of the output shaft and with the gear selector mechanism of the base portion to prevent shifting to a certain gear or certain gears in the basic portion when the rotational speed of the output shaft exceeds a certain value or certain values.

It is usual in heavier transport vehicles, which are as a rule equipped with diesel engines, to arrange gearboxes with eight and sometimes up to sixteen speeds forward in order to be able to effectively use, in all situations, the diesel engine which operates within a limited r.p.m. range. In order to provide comfortable shifting, a shift lever is arranged which has only one half or one fourth as many lever positions as the total number of gears in the gearbox. The gear lever is coupled to a base portion, while a separate operating means, for example a toggle switch on the lever, is coupled to the range portion.

In, for example, a gearbox with a total of eight gears forward, the base portion has four gears with the lever positions in a conventional "H" shape. The range portion has two gears, thus doubling the number of gears in the base portion, and the operating means has thus only two positions. With this division the position of the shift lever in fifth gear is the same as in first gear, sixth the same as second, etc.

In known constructions, it is usual to allow the range portion toggle switch to mechanically or pneumatically switch over a relay valve, which guides compressed air to one side or the other of the piston in a pneumatic piston-cylinder device which forms the shift unit of the range portion. In the connection between the source of compresssed air and said valve, there is a blocking valve actuated by the forward-and-back movement of the shift lever and opens only when the lever is in the neutral position. By this arrangement it is possible, by switching the toggle switch, to preselect the gear ratio range of the range portion, with the actual shifting taking place only when the shift lever comes to the neutral position and opens the blocking valve. It is important here that the shifting in the range portion be entirely completed before the shift lever is moved from the neutral position for shifting in the base portion of the gearbox. If the shifting in the base portion takes place before the range portion has completed its shift, the latter's synchronization must also drive the rotating mass of the entire base portion, which it cannot do without incurring damage.

In order to solve this problem and prevent the gear selector of the base portion from being able to be moved from the neutral position during shifting in the range portion, it is known to arrange a mechanical connection between the shift unit of the range portion and the gear selector of the base portion. If, however, the driver attempts to force the gear selector from its neutral position, the shifting movement of the shift unit is opposed mechanically and in certain critical positions can be completely blocked. Another disadvantage with a mechanical connection is that the relative positions of the shift unit and the gear selector of the base portion are essentially fixed.

Another problem with gearboxes of the type in question is how to prevent engagement of too low a gear in the base portion when the r.p.m. of the output shaft has exceeded a certain value, to prevent, for example, the gear lever from being moved from fourth to the position for first with the intention of shifting to fifth, when one has forgotten to shift up the range portion. It is known in this case to arrange r.p.m. sensing means which sense the r.p.m. of the output shaft and which interact with a piston-cylinder device which acts axially on the gear selctor of the base portion. If the shaft lever is on the side for first and second and if the r.p.m. exceeds a certain value, the piston-cylinder device will push the gear selector away from this side.

The purpose of the present invention is to achieve a device of the type described in the introduction, which makes possible a simple and effective, combined solution to both of the above-mentioned problems, which at the same time eliminates the above-mentioned disadvantages of a mechanical connection.

This is achieved according to the invention in that the first and the second blocking systems have a common blocking device, that the first system has means which sense the shifting movement of the shift unit, said means being disposed to activate the blocking device to block the gear selector of the base portion in the neutral position during the shifting movement, and that the second system has means for sensing the lateral position of the gear lever of the base portion, said means being disposed, depending on the rotational speed of the output shaft, in the lateral position of first and second gear, to actuate the blocking device to block the gear selector of the base portion in the neutral position.

The invention achieves in a simple manner the double blocking function with a single blocking device, without requiring any axial displacement device for the locating key or mechanical connection between the locating key and the shift unit.

Figure 2:
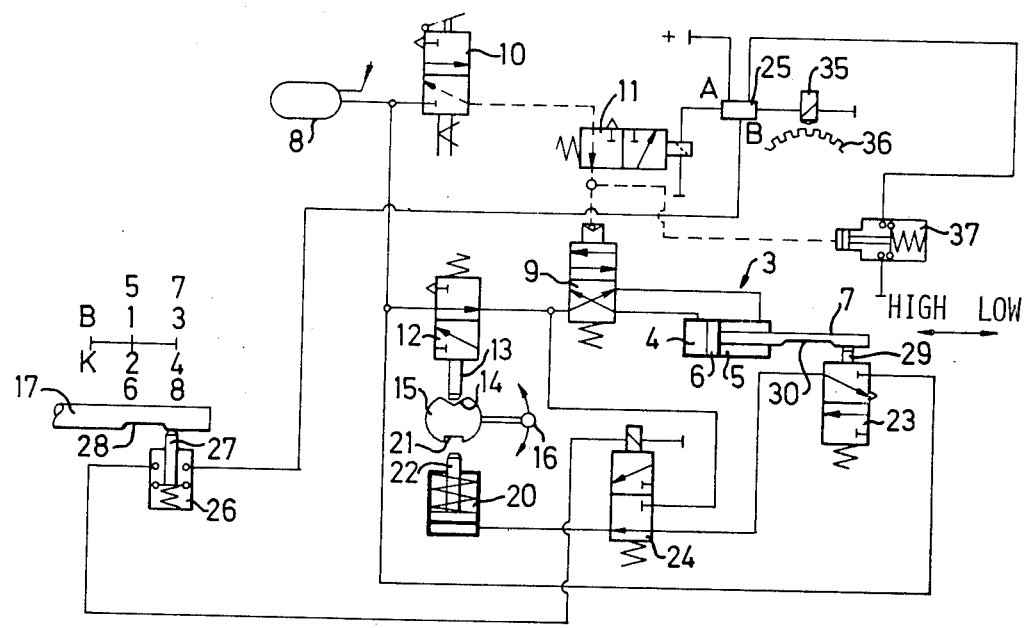

The invention will be described below with reference to the accompanying drawings, in which FIG. 1 shows a side view of a gearbox, comprising a base portion and a range portion, in simplified form with a cut-away housing, and FIG. 2 shows a schematic diagram of an embodiment of a device according to the invention.

The gearbox shown in FIG. 1 comprises a four-speed base portion 1 and a two-speed range portion 2 coupled to the output shaft thereof. The gear ratios of te range portion 2 are chosen so that with the lower gear engaged first through fourth gear are obtained and with the higher gear engaged fifth through eighth gear are obtained. The solid line indicates the transmission from the input to the output shaft in second gear and the dashed line in sixth gear. The shifting in the base portion 1 is achieved in a conventional manner by means of a shift lever (not shown in FIG. 1). The shifting in the range portion 2 is achieved by means of a shift unit (indicated at 3), which is shown in FIG. 2 in the form of a pneumatically operated piston-cylinder device.

The piston-cylinder device 3 is double acting and has a cylinder chamber 4 and 5 on either side of a piston 6, whose piston rod 7 engages the gear selector of the range portion, for example in a manner known per se and not shown here. The supply of compressed air from a compressed air tank 8 to one of the cylinder chambers 4 or 5 is controlled with the aid of a pneumatically operated relay valve 9 which receives operating pressure via a preselector valve 10 and a blocking valve 11. A blocking valve 12 is coupled into the compressed air line from the tank to the shift unit 3 and before the relay valve 9. The valve 12 has an operating rod 13 which can be inserted into a cavity 14 in the gear selector 15 of the base portion, thereby opening the valve. The cavity 14 is placed so that the valve opens only when the gear selector 15 of the base portion is in its middle or neutral position.

FIG. 2 shows the gear selector 15 in the form of a shaft, turnably journalled transversely to the base portion, which is joined to a shift lever 16. The lever 16 is shown in the neutral or middle position and is moved in the direction of the arrows to engage a gear, thereby lifting the operating rod 13 of the valve 12 so that the valve closes and prevents shifting in the range portion.

The shift lever 16 is joined in a manner not shown in more detail here with a lateral control shaft 17, so that the shaft 17 is moved to the right or left respectively in FIG. 2, when the shift lever is moved laterally between the side positions of first/second and third/fourth.

According to the invention a blocking device 20 in the form of a pneumatically operated, single acting piston-cylinder device is coordinated with the gear selector 15. The gear selector is also made with a cavity 21 which is so placed in relation to the piston rod 22 of the piston-cylinder device 20 that the end of the piston rod can be inserted in the cavity 21, when the gear selector is in the neutral postion, thus blocking the gear selector.

The blocking cylinder 20 can be supplied with compressed air from the pressure tank 8 via a mechanically operated blocking valve 23 and a magnetic valve 24 or via the previously mentioned blocking valve 12 and the magnetic valve 24 depending on which blocking function is to be employed. The magnetic valve 24 is electrically connected to an electronic r.p.m. switch 25 via a mechanically operated switch 26 which has an operating rod 27 in contact with the lateral control shaft 17, which in turn has a cavity 28 in which the end of the rod can be inserted to close the switch 26. The cavity is placed so that the switch 26 closes in the first/second gear side postion. In a corresponding manner, the blocking valve 23 is operated by means of an operating rod 29, which when it extends into a cavity 30 in the piston rod 7 of the shift unit 3, opens the valve 23. The cavity is arranged so that the valve 23 is kept open as the piston rod 7 moves between its end positions, i.e. during the entire shifting movement.

The electronic r.p.m. switch 25, which can be of a type which is known per se, e.g. V.D.O. Part Number K 411.404/001/002, is electrically connected to an inductive sensor 35 which is arranged in front of a toothed gear 36 on the output shaft of the gearbox. The sensor produces a pulsating voltage to the r.p.m. switch 25 which depends on the r.p.m. of the gear and thus of the output shaft. Furthermore, a pressure medium controlled switch 37 is electrically connected to the r.p.m. switch 25. The operating side of the switch 37 communicates with the operating side of the relay valve 9, so that it breaks its circuit when the relay valve is subjected to operating pressure. The r.p.m. switch 25 has an output A, which is electrically connected to the magnetic valve 11, and an output B, which is electrically connected to the switch 26.

The functioning of the arrangement according to the invention will now be described, in which we will assume the following by way of example.

The outputs A and B of the r.p.m. switch 25 are currentless from 0–375 r.p.m. of the output shaft of the gearbox, with 375 r.p.m. lying just above the r.p.m. which can be reached in second gear.

At 375 r.p.m. the current is sent through output B when the switch 37 is off, and is shut off at 725 r.p.m., with 725 r.p.m. lying just above the r.p.m. which can be achieved in fourth gear.

A is current-carrying from 725 r.p.m. and higher.

When the switch 37 is closed, the r.p.m. range changes in which output B is current-carrying, from 375–725 r.p.m. to 1380 r.p.m. and higher, 1380 r.p.m. lying just above the r.p.m. which can be reached in sixth gear.

It can be seen from the settings of the components in the diagram in FIG. 2 that high range is engaged and that the r.p.m. is less than 725 r.p.m., so that the magnetic valve 11 is open and permits downshifting to low range. The switch 37 is closed so that the r.p.m. switch 25 is set to emit current from output B from 1380 r.p.m. Thus one is free to shift from fifth to fourth or to sixth.

When shifting to low range and to fourth gear, the valve 23 opens during the movement of the piston rod 7 from left to right. This supplies the blocking cylinder 20 with pressure medium so that the end of the piston rod 22 is inserted into the cavity 21 in the gear selector 15 and blocks it in the neutral position until the shifting is completed. When shifting to low range, the pressure controlled switch 37 is put under pressure and breaks its circuit, thus changing the r.p.m. range for current at output B from 1380 r.p.m. plus to 375–725 r.p.m. If the shift lever should be moved to the side for first/second, the rod 27 will go into the cavity 28 in the shaft 17, thus closing the switch 26. The magnetic valve 24 shifts from the position shown and compressed air is supplied to the blocking cylinder 20. In this way shifting into first or second is prevented at too high r.p.m.

When the r.p.m. of the output shaft exceeds 725 r.p.m., the valve 11 closes because output A becomes live. Consequently, above this r.p.m. low range cannot be engaged.

At r.p.m.s of over 1380, output B is live. This prevents shifting into fifth or sixth in a corresponding manner to that above because the switch 26 closes, thus supplying air to the blocking cylinder 20.

In the functioning described above, it is for example not possible to move the shift lever to the position for first/fifth, when intending to shift from fourth to fifth, if one has forgotten to shift up the range portion.

The arrangement according to the invention thus makes it possible, with simple means and in an effective manner, to prevent any such incorrect shiftings which could result in damage to the vehicle or create dangerous traffic situations.

What we claim is:

1. Arrangement for preventing incorrect shifting in a gear-box preferably intended for heavier motor vehicles, said gearbox having a base portion with a number of gear ratios and a two-speed range portion, coupled to the output shaft of the base portion, and having such gear ratios that the total gear ratio of the gearbox, when the higher gear ratio of the range portion is used together with the lowest gear ratio of the base portion, is higher than that when the lower gear ratio of the range portion is used together with the highest gear ratio of the base portion, the range portion having a gear selector mechanism coupled to a shift unit, said device comprising a first blocking system which is coordinated with the shift unit of the range portion and a gear selector mechanism of the base portion to oppose shifting in the base portion during the shifting movement of the shift unit in the range portion, and a second blocking system which is coordinated with means for sensing the rotational speed of the output shaft and with the gear selector mechanism of the base portion to prevent shifting to a certain gear or certain gears in the base portion when the rotational speed of the output shaft exceeds a certain value or certain values, characterized in that the first and the second blocking systems have a common blocking device, that the first system has means which sense the shifting movement of the shift unit, said means being disposed to activate the blocking device to block the gear selector of the base portion in the neutral position during the shifting movement, and that the second system has means for sensing the lateral position of the gear lever, said means being disposed, depending on the rotational speed of the output shaft, in the lateral position of first and second gear to actuate the blocking device to block the gear selector of the base portion in the neutral position.

2. Arrangement according to claim 1, in which the shift unit is a pressure medium operated piston-cylinder device, characterized in that the blocking device is also a pressure medium operated piston-cylinder device, and that the means sensing the shifting movement comprise a valve coupled into the pressure line to the blocking device, said valve interacting with the piston rod of the shift unit to open as the piston rod moves between its two shift positions.

3. Arrangement according to claim 2, characterized in that said valve has an operating member in contact with the piston rod of the shift unit, and that the piston rod has a longitudinal cavity between its shift positions, into which cavity the operating member extends during the shifting movement to open the valve.

4. Arrangement according to claim 2 or 3, characterized in that the means for sensing the lateral position comprises a switch interacting with a lateral control member in the base portion and closing in the lateral position for first and second gear, said switch being in an electric circuit between the r.p.m. sensing means and a magnetic valve in the pressure line between the blocking device and the shift movement sensing valve, said magnetic valve establishing in one position a connection between the blocking device and the shift movement sensing valve and in its other postion between the blocking device and netural-position-sensing blocking valve which is open in the neutral postion of the shift lever.

5. Arrangement according to claim 4, characterized in that the lateral control member is an axially displacable shaft or rod, and that said switch has an operating member in contact with the shaft or rod, which in the area for the side position of first and second gear has a cavity for the operating member which, in this postion, closes the switch.

6. Arrangement according to claim 4, characterized in that the r.p.m. sensing means comprise an r.p.m. switch in series with the first mentioned switch, said r.p.m. switch having, in a gearbox with a four-speed base portion, a lower shut-off r.p.m. which lies within the r.p.m. range of third gear, and a higher shut-off r.p.m. which lies within the r.p.m. range of seventh gear.

7. Arrangement according to claim 6, characterized in that the r.p.m. switch is electrically connected to a pressure medium controlled switch which in the pressureless state sets the r.p.m. switch to break the current to said first mentioned switch at said higher r.p.m., and in the pressure influenced state at said lower r.p.m., the pressure medium controlled switch being controlled by the operating pressure from a relay valve which controls the supply of pressure medium to the unit.

* * * * *